UNITED STATES PATENT OFFICE 2,397,379

MINERAL OIL COMPOSITION RESISTANT TO FOAMING

Herschel G. Smith, Wallingford, and Troy L. Cantrell, Lansdowne, Pa., assignors to Gulf Oil Corporation, Pittsburgh, Pa., a corporation of Pennsylvania No Drawing. Application September 21, 1942, Serial No. 459,179

4 Claims. (Cl. 252—51)

This invention relates to improved mineral oil compositions resistant to foaming.

In lubricating machinery with oils, and in handling oils as by pumping, conditions are often such that the oil is subjected to violent agitation in the presence of air or other gases: conditions such as to produce foam or froth. In some cases foaming or frothing is quite objectionable. For example, in lubricating automobile gearing (in the gear box, and rear axle) foaming produced by the churning of the gear gives rise to excessive leakage and loss of lubricant past retainer rings, etc. Moreover, foaming seriously interferes with the proper functioning of the oil. Automobile gears such as those used in transmission and differential gear assemblies often operate at very high speeds, as well as under high tooth pressures; therefore they require a very good lubricant to prevent or retard excessive wear due to metal-to-metal contact, and foaming is undesirable. The lubricants employed are viscous oils, often containing a so-called extreme pressure agent to assist in maintaining an oil film between the teeth; sulfurized sperm oil being especially good. If the lubricant contains air dispersed through it, it lacks proper film foaming properties. Moreover foaming oil is much less effective to conduct heat away from the working zone. These difficulties are often aggravated by the fact that some extreme pressure agents present in the oil actually increase the foaming characteristics of the oil composition.

Foaming is also objectionable in other situations; for example, during the pumping of oils, and in compounding oils with extreme pressure agents and other additives—an operation involving thorough agitation. Nearly all petroleum oils foam to some extent under violent agitation: the more viscous the oil the greater the amount of foam and the longer it persists after agitation is stopped.

Among the objects of our invention is the provision of gear lubricants and other lubricating compositions characterized by freedom from tendency to foam or froth even under severe conditions.

We have discovered that foaming of petroleum oils, even under the most violent conditions described, can be suppressed or prevented, by incorporating in the mineral oil a small proportion of pyridine isoamyl octyl phosphate.

In general, dissolving almost any additive agent in oil has a tendency to increase foaming more or less. This compound is remarkable in that it suppresses foaming, even when present in small amounts. It has no deleterious effect on the lubricating properties or other properties of the oil.

This agent can be incorporated in all sorts of oils, to achieve the stated results. One particularly advantageous field of use is in gear lubricants for automobiles and the like. As stated, these lubricants are viscous and they contain extreme pressure agents or other additives; both of which facts make for heavy foaming. By dissolving a fraction of a per cent of our agent in the lubricant foaming is prevented. For example, such a gear lubricant, within the purview of our invention, has the following composition (per cent by weight):

Refined high-viscosity, lubricating oil__ 89 to 95
Refined sulfurized sperm oil_____ 5 to 10
Pyridine isoamyl octyl phosphate_____ 0.01 to 1.0

Another field of use is in light (low viscosity) oils used in so-called fluid drives or in hydraulic drives. With these light oils (which are often of viscosity as low as SAE 10 grade) agitation may produce considerable foam, even though the foam subsides very quickly on ceasing agitation. The agent is also useful in cutting oils and indeed in any oil or oily composition, whether used as a lubricant or not, in which it is desired to prevent foaming.

In preparing the new agent, pyridine is brought into reaction with isoamyl octyl acid ortho-phosphate, and the pH of the reaction mixture is adjusted to within the range 2.0 to 5.5. With the theoretical molecular ratio of the two reactants, namely 1:1, the product is apt to be slightly too acid, with a pH below 2, and this is taken care of by using a slight excess of the pyridine, so that the molecular ratio is between 1:1 and 1:1.1. The reaction product is an oily liquid. It readily dissolves in oils or oil compositions.

The proportion of the agent to be dissolved in the oil or oil base depends on the viscosity of the oil, its ingredients, and the severity of the conditions of use. Ordinarily 0.01 to 1.0 per cent of the agent by weight of the oil is employed; the pyridine isoamyl octyl phosphate being a very effective agent for the present purposes. Of course, higher percentages can be used, if desired, for especially severe conditions.

Isoamyl octyl ortho-phosphate is a brown, oily liquid. Its specific gravity is 1.009 at 24°/4° C. and its viscosity 210, 75 and 29 centipoises at 25, 50 and 75° C. respectively. It is insoluble in water and soluble in mineral oils to the extent of 11.70 parts in 100 parts of oil at 20° C. The ortho-phosphate decomposes at 302 to 311° F.

It has the following formula:

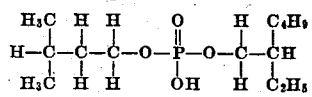

Pyridine is a slightly yellow to colorless liquid, having a sharp empyreumatic odor. It has a specific gravity of 0.988 at 15° C., a melting point of −45° C., and a boiling point of 115.3° C. It is soluble in water, alcohol, ether, benzine, benzol, and fatty oils. It has a molecular weight of 79.05, and has the following formula:

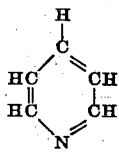

Our preparation, the reaction product of the above, has the probable formula:

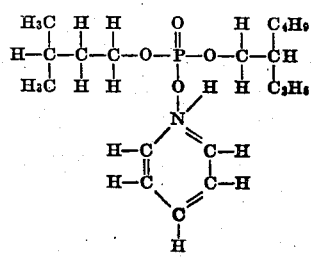

The following example illustrates one advantageous way of preparing our foam suppressor:

Example I.—Seventy-nine pounds of pyridine were added to an iron vessel equipped with an air lance and 281 pounds of isoamyl octyl orthophosphate were introduced over a period of one hour; the slow rate of addition being desirable to maintain the temperature of the reaction mixture below 212° F. At the conclusion of this reaction, the temperature was 180° F. and the pH of the mixture was 2. A pH of 3.5 was desired; 8 pounds of pyridine were added, which brought the pH to 3.5. The reaction product was an oily liquid. It was readily soluble in mineral oils.

Pyridine isoamyl octyl phosphate is a new chemical compound which is claimed per se in applicants' copending application Serial No. 640,666, filed on January 11, 1946, as a continuation-in-part of the present application.

As the pyridine isoamyl octyl phosphate is substantially insoluble in water, the pH equivalent is measured by the following expedient. Normal butanol (which contains a small amount of water) is adjusted to exact neutrality, pH=7.0, and the sample is dissolved therein. The pH of the solution is then measured in the ordinary way as for aqueous solutions, by electrometric or colorimetric methods. The butanol appears to serve as a blending agent for dissolving the sample of water, so to speak.

It will be noted that the measured pH of the aminophosphate is low despite the fact that a slight excess of amine is present. This is because the reaction involves neutralizing a rather strong acid with a very weak base.

Moreover, traces of mono-, di- and tribasic acids may be formed under the conditions of the pH determination. At any rate, the results are as stated.

The following example illustrates the preparation of a gear lubricant in accordance with the invention.

Example II.—A highly viscous, highly refined Pennsylvania oil was selected as the base, and in it was dissolved 0.04 per cent of the oily reaction product of Example 1. As shown in the following table the change in viscosity and in color by incorporation of the agent was negligible.

| Composition | Straight oil | Improved oil |
| --- | --- | --- |
| Gravity, °API | 26.5 | 26.4 |
| Viscosity SUV: | | |
| 100° F | 1,907 | 1,894 |
| 210° F | 140.1 | 140.4 |
| Color, NPA | 4.75 | 4.75 |

To evaluate the foaming properties of the straight oil and the improved oil, samples (500 cc.) of the two oils were subjected to foam test No. 1 (described below). The results were as follows:

| Composition | Straight oil | Improved oil |
| --- | --- | --- |
| At end of stirring (15 minutes): | | |
| Temperature, °F | 84 | 83 |
| Volume of oil and foam, cc | 1,756 | 540 |
| Ratio [1] | 3.52 | 1.08 |
| After 1 hr. standing: | | |
| Temperature, F | 77 | 77 |
| Volume of oil and foam, cc | 670 | 500 |
| Ratio [1] | 1.34 | 1.00 |
| Nature | Fine | No foam |

[1] Ratio of $\frac{\text{volume of oil and foam}}{\text{volume of original oil}}$ It will be observed that the straight oil developed twice its volume of foam under the conditions of the test and that an appreciable volume of foam remained even after an hour's standing; while the improved oil developed only a negligible amount of foam, which was all gone at the end of an hour.

Decreasing the percentage of 0.01 still leaves the oil much less susceptible to foaming than the straight oil.

The foam suppressor as stated can be added to compounded lubricants to prevent foaming thereof. It is compatible with most of the other types of improvement agents now employed and the amount required to prevent foaming in such compounded lubricants is relatively small and does not deleteriously affect the other properties of compounded lubricants. This is an important part of the invention, as certain of the agents employed to impart particular properties to lubricating oils have been found also to promote the foaming of the oil composition when agitated. By adding even traces of the present foam suppressor, such compounded lubricants become very resistant to foaming, even under drastic service conditions.

In making up compounded lubricants of this type it is advantageous to dissolve the aminophosphate in the oil first, as thereby foaming is prevented during the step of mixing in the extreme pressure agent or other additive. But so far as performance of the lubricant in service is concerned, the order of addition makes no difference.

The following example illustrates the properties of an extreme pressure gear lubricant prepared in accordance with the invention.

Example III.—A modern gear lubricant contains 92.0 per cent by volume of a highly refined viscous Pennsylvania oil and 8.0 per cent of a special synthetic mixture containing around 10 per cent sulfur. A similar lubricant prepared according to the invention contains these oils in the proportions of 92.0 per cent and 8.0 per cent respectively, and 0.04 per cent of pyridine isoamyl octyl phosphate. The viscosity of the modern lubricant was 1918 SUV at 100° F., 767 at 130° F., and 141 at 210° F. The viscosity of the improved lubricant was only negligibly different from this, and the same was true of the other characteristics—gravity, viscosity index, flash and fire tests, pour test, color, sulfur, copper strip tests, centrifuge test (for gravity-separable matter), and carbon residue. The neutralization number of the new lubricant was 0.56 against 0.50 for the old. The surface tensions were nearly identical. The Almen and Timken tests, indicative of the lubricating value of the oil, as secured on the compounded oil before the addition of the foam suppressing agent, were the same as the corresponding tests made after the addition of the indicated amount of this foam suppressor.

In other words, the characteristics of the two lubricants were practically the same—except for the foaming properties. The following are comparable tests (the nature of which is described in detail below) on these properties. The samples were 500 cc. each, the speed of the agitators 550 R. P. M. and the initial temperature 77° F.

*Foam tests*

|  | Old lubricant | New lubricant | |
|---|---|---|---|
| After stirring for | 15 min. | 15 min. | 44 hr. |
| Temperature, °F | 84 | 83 | 83. |
| Oil+foam, cc | 1,750 | 540 | 590. |
| Vol. of oil+foam / Vol. of oil | 3.50 | 1.08 | 1.18. |
| After standing 1 hr. after stirring stopped: | | | |
| Temperature, °F | 77 | 77 | 77. |
| Oil+foam, cc | 665 | 500 | 500. |
| Vol. of oil+foam / Vol. of oil | 1.35 | 1.00 | 1.08. |
| Nature of foam | Fine | None | None. |

To evaluate the foaming tendency of petroleum oils and compositions a test was devised which affords an exceptionally accurate indication of the comparative foaming tendencies. A sample of oil is subjected to very drastic foaming conditions under a standardized procedure which makes it possible to determine quantitatively the tendency of the oil to foam and the stability or permanency of the foam produced. In general it resembles a somewhat similar testing method employed by the General Motors Corporation for determining the foaming tendencies of gearing lubricants, but has been modified in the direction of greater accuracy and in order to make it possible to record more comprehensible test data.

*Foaming test (No. 1)*

An agitating means is provided which is an adaptation of an ordinary commercial motor-driven household mixer—a "Sunbeam Mixmaster," Model 1, manufactured by the Flexible Shaft Company, Chicago, Ill. The device employed in the test is the usual household model with two slight changes: the turntable of the usual household mixer is replaced by a rigid platform, and a cylindrical brass container having an inside diameter of 7 inches and an inside height of 4 inches is substituted for the usual household glass mixing bowl. The container is fitted with a gage for measuring the depth of oil or oil and foam therein before and after agitation.

The agitator device itself comprises a pair of motor driven beaters which are of the convex outside surface type as described in U. S. Patent 2,161,881, each beater having a pair of blades of the type indicated and being so positioned with respect to each other that the two pairs of beater elements are at right angles and rotate in opposite directions in closely spaced, overlapping paths. In operating position, the beaters are perpendicular to the base of the mixer, as shown in Patent 2,161,881. In the present test they are centered in the container, and the bottom of the beaters is spaced approximately $\frac{1}{8}$ inch from the bottom of the pan when the latter is positioned on the rigid platform. With 500 cc. of oil in the container, the beaters are submerged in the initial oil sample only to a depth of $\frac{3}{4}$ to one inch. The beaters are rotated at a speed of 550 R. P. M. controlled within ±10 R. P. M.

A measured sample of 500 cc (±5 cc.) of oil is introduced into the container, and the temperature of the sample is brought to 77° F. and the container is then placed in position and the beater elements lowered into operating position.

The motor is started and adjusted to the speed indicated above. The beaters agitate the oil and beat air into the sample. Agitation is continued for exactly 15 minutes.

The motor is now stopped, the beaters are removed from the oil, and any oil or foam adhering to the beaters is permitted to drain into the container, which takes one or two minutes. The foam level is then immediately determined, and the temperature of the sample is measured. It is then possible to calculate the ratio of the volume of oil and foam to the volume of the original oil, with correction for any temperature changes.

The container is removed and allowed to stand quiet for one hour (measured from the time the stirring is stopped). The volume and temperature measurements are taken again, and serve to indicate stability or permanence of the foam produced.

The test procedure may of course be varied, as for example by changing the size of the sample, the speed of agitation or the time of agitation, or by taking the final measurements at an earlier or later period. However, in the test referred to in the specific example above, the procedure was precisely as indicated.

Test No. 2 is the same as test No. 1 except that agitation is continued for 44 hours instead of 15 minutes. (Longer periods of agitation may be employed if a still more drastic test is required.)

In some very low viscosity oils considerable foam may develop during agitation, which disappears very quickly when agitation is stopped. These conditions are found, for example, in marine turbine lubrication systems (which use light oils) at the point where returned oil is discharged violently into a reservoir. To evaluate foaming in such cases there is employed a third test, No. 3, similar in all respects to test No. 1 except that the measurements of oil and foam are made while the motor is still running. The following example shows how a turbine oil treated according to the invention behaves under such conditions.

*Example IV.*—A highly refined Pennsylvania turbine oil was subjected to test No. 3. After 15 minutes agitation, the oil plus foam measured 800 cc., as compared with 500 cc. for the original oil. The same oil after treating with 0.01 per cent pyridine isoamyl octyl phosphate showed only 540 cc. of oil plus foam.

While our invention has been described above with reference to various specific examples and embodiments, it will be understood that the invention is not limited to such illustrative examples and embodiments, but may be variously practiced within the scope of the claims herein made.

What we claim is:

1. A mineral oil composition resistant to foaming, comprising mineral oil and a small proportion of pyridine isoamyl octyl phosphate.

2. The composition of claim 1 wherein the proportion of said pyridine phosphate salt is between 0.01 and 1.0 per cent by weight of the composition.

3. A mineral oil resistant to foaming, comprising a small proportion of the reaction product of pyridine and isoamyl octyl ortho-phosphate, said reaction product being an oily, oil-soluble liquid, and having an acidity equivalent to a pH value between 2.0 and 5.5.

4. A gear lubricant comprising a viscous mineral lubricating oil, an extreme pressure agent of a characteristic such as to increase tendency of the oil to foam, and a small proportion, sufficient to prevent foaming, of pyridine isoamyl octyl phosphate.

HERSCHEL G. SMITH.
TROY L. CANTRELL.